(12) United States Patent
Germanovich et al.

(10) Patent No.: US 10,629,315 B2
(45) Date of Patent: *Apr. 21, 2020

(54) ABYSSAL SEQUESTRATION OF NUCLEAR WASTE AND OTHER TYPES OF HAZARDOUS WASTE

(71) Applicant: Grand Abyss, LLC, Tulsa, OK (US)

(72) Inventors: Leonid N. Germanovich, Atlanta, GA (US); Lawrence C. Murdoch, Clemson, SC (US); Marvin Robinowitz, Tulsa, OK (US)

(73) Assignee: Grand Abyss, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,529

(22) Filed: Jul. 23, 2018

(65) Prior Publication Data
US 2019/0051423 A1    Feb. 14, 2019

Related U.S. Application Data

(63) Continuation of application No. 15/682,238, filed on Aug. 21, 2017, now Pat. No. 10,032,535, which is a (Continued)

(51) Int. Cl.
*B09B 1/00* (2006.01)
*G21F 9/24* (2006.01)
(Continued)

(52) U.S. Cl.
CPC .............. *G21F 9/24* (2013.01); *B09B 1/008* (2013.01); *B65G 5/00* (2013.01); *G21F 9/34* (2013.01)

(58) Field of Classification Search
CPC ...................................................... B09B 1/008
See application file for complete search history.

(56) References Cited

U.S. PATENT DOCUMENTS

| | | |
|---|---|---|
| 3,142,638 A | 7/1964 | Blaisdell |
| 3,274,784 A | 9/1966 | Shock |

(Continued)

FOREIGN PATENT DOCUMENTS

| | | |
|---|---|---|
| CN | 1043185 A1 | 6/1990 |
| CN | 102002356 B | 4/2011 |

(Continued)

OTHER PUBLICATIONS

Gudmundsson, Rock Fractures in Geological Processes, 2011, Cambridge University press, p. 540.*

(Continued)

*Primary Examiner* — Janine M Kreck
(74) *Attorney, Agent, or Firm* — Gable Gotwals

(57) ABSTRACT

A system and method of disposing nuclear waste and other hazardous waste includes means for, and the steps of, blending a waste stream, which includes either a radioactive waste or a hazardous waste (or both), with a liquid and, optionally, a solid material to produce a dense fluid and pumping the dense fluid into a tubing string of an injection boring. The dense fluid then exits a perforation in a casing of the injection boring and enters a fracture in a rock strata, where it continues to propagate downward until it reaches an immobilization point. The dense fluid may be a slurry formed by a metal and a cross-linked polymer gel or hydrated clay slurry. The metal can be one that has a melting temperature less than the temperature at the bottom of the injection boring. The solid material could also be other nuclear waste or a radionuclide.

19 Claims, 3 Drawing Sheets

Related U.S. Application Data continuation of application No. 15/344,243, filed on Nov. 4, 2016, now Pat. No. 9,741,460, which is a continuation of application No. 14/942,643, filed on Nov. 16, 2015, now Pat. No. 9,700,922, which is a continuation of application No. 14/129,504, filed as application No. PCT/US2012/045084 on Jun. 29, 2012, now Pat. No. 9,190,181.

(60) Provisional application No. 61/502,557, filed on Jun. 29, 2011.

(51) Int. Cl.
*G21F 9/34* (2006.01)
*B65G 5/00* (2006.01)

(56) References Cited

U.S. PATENT DOCUMENTS

| | | |
|---|---|---|
| 5,010,527 A | 4/1991 | Mahrer |
| 5,133,624 A | 7/1992 | Cahill |
| 5,489,740 A | 2/1996 | Fletcher |
| 5,536,115 A | 7/1996 | Keck |
| 5,589,603 A | 12/1996 | Alexander et al. |
| 5,771,170 A | 6/1998 | Withers et al. |
| 5,875,843 A | 3/1999 | Hill |
| 5,961,438 A | 10/1999 | Ballantine et al. |
| 6,002,063 A | 12/1999 | Bilak et al. |
| 6,137,028 A | 10/2000 | Snow |
| 6,312,515 B1 | 11/2001 | Barlet-Gouedard et al. |
| 7,377,721 B2 | 5/2008 | Patel |
| 9,190,181 B2* | 11/2015 | Germanovich .......... G21F 9/24 |
| 9,700,922 B2* | 7/2017 | Germanovich .......... G21F 9/24 |
| 9,741,460 B2* | 8/2017 | Germanovich .......... G21F 9/24 |
| 10,032,535 B2* | 7/2018 | Germanovich .......... G21F 9/24 |
| 2004/0023812 A1 | 2/2004 | England et al. |

FOREIGN PATENT DOCUMENTS

| | | |
|---|---|---|
| DE | 3901920 | 8/1989 |
| JP | H02256791 A | 10/1990 |

OTHER PUBLICATIONS

English Translation: Liu Gonghui, et al; JRNL of C, "similarity criterion in Simulation Experiment of Hydraulic Fracture", Oct. 31, 2000, vol. 24, No. 5, Publisher: ournal of China University of Petroleum(Edition of Social Sciences).

Zhang Ping, "Research and Application of Hyposmosis Bottom Water Reservoir Fracturing Technology", ,No. 5, Publisher: China Doctor Dissertation Full-text Database; Engineering Technology I.

Zhao Wanchun, "(Definition: Research of Evolution of Non-linear Damage of Hydraulically Fractured Rock); he Zhao dissertation discloses an external driving force for fracture extending in a rock and associated formulas—no image included—English version not availabl", "China Doctor Dissertation Full-text Database", , pp. 50-51, No. 3, Publisher: Engineering Technology I.

* cited by examiner

ABYSSAL SEQUESTRATION OF NUCLEAR WASTE AND OTHER TYPES OF HAZARDOUS WASTE

CROSS-REFERENCE TO CO-PENDING APPLICATIONS

This application is a continuation of U.S. patent application Ser. No. 15/682,238 filed Aug. 21, 2017, which was a continuation of U.S. patent application Ser. No. 15/344,243, filed Nov. 4, 2016, now U.S. Pat. No. 9,741,460, which was a continuation of U.S. patent application Ser. No. 14/942,643, filed Nov. 16, 2015, now U.S. Pat. No. 9,700,922, which was a continuation of U.S. patent application Ser. No. 14/129,504 filed Dec. 26, 2013, now U.S. Pat. No. 9,190,181, which was a United States National Phase of PCT Patent Application No. US2012/045084 filed on Jun. 29, 2012, which claimed priority to U.S. Provisional Patent Application No. 61/502,557 filed Jun. 29, 2011, all of which are incorporated herein by reference.

BACKGROUND OF THE INVENTION

Nuclear reactors generate 19 percent of the electricity in the U.S., and this process generates high-level radioactive waste in the form of uranium oxide or mixed oxide fuels. Approximately 1000 $m^3$ (6200 bbl) of high-level waste is produced each year from commercial reactors in the U.S., and additional material is generated by military operations. Europe is also heavily invested in nuclear power (e.g. more than three-fourths of the electricity in France is generated by nuclear reactors), and other countries worldwide have started to aggressively pursue nuclear energy to power their growing economies.

As a result, the current rate of nuclear waste generation is approximately 10,000 $m^3$/yr, and the amount of radioactive waste being generated worldwide is expected to increase significantly. Yet, there are no safe, reliable ways to dispose of nuclear waste on site, that is, at the source of the waste's generation. This waste includes but is not limited to spent nuclear fuel from nuclear reactors, high-level waste from the reprocessing of spent nuclear fuel, transuranic waste mainly from defense programs, and uranium mill tailings from the mining and milling of uranium ore. High-level nuclear waste is currently stored at the reactor where it was generated.

The only serious options for disposal being considered are to place the waste in low permeability geologic formations, like tight rock or clay. The current approach for disposal of radioactive waste is not without problems. Congress has mandated a 10,000-year period of isolation, but it is difficult to guarantee that waste at the shallow depths of current repositories will remain isolated from the biosphere, or human intervention, for even a fraction of this time.

Yucca Mountain, a 300-m-deep facility near Las Vegas, is the only U.S. option for high-level waste disposal. This facility has been scrutinized for 20 years, and even after a $50B expenditure the earliest it could open is 2017. Considerable political opposition by Congress, the state of Nevada and others may delay opening even further. For example, Congress did not provide any funding for development of the site in the 2011 federal budget. Significant uncertainty exists about the feasibility of waste placed at a depth of 300 m remaining isolated from the biosphere for 10,000 years, and this uncertainty is the basis for much of the opposition to Yucca Mountain. Even if Yucca Mountain does open, all its capacity has been allocated and options for additional capacity are being considered.

The politics involved in finding permanent disposal sites is, at best, difficult and, at worst, intractable. Because the waste remains radioactive for a very long time, no one wants this waste traveling through their "backyard" on its way to a permanent disposal site or in their "backyard" as the disposal site. As politicians and the public continue to debate the issue, the waste remains temporarily stored on site in ways that are arguably far less safe than any proposed permanent disposal solution. For example, nuclear reactors temporarily store the waste on site in water pools. The devastating earthquake and tsunami in northeast Japan, which knocked out power sources and cooling systems at Tokyo Electric Power Co's Fukushima Daiichi plant, demonstrates how tenuous and potentially dangerous this storage practice really is.

Therefore, a need exits for a safe, reliable method of disposing nuclear waste on site and one that could achieve the 10,000 year period of isolation required by Congress and sought by other countries.

SUMMARY OF THE INVENTION

A system and method according to this invention involves storing nuclear waste or hazardous waste in hydraulic fractures driven by gravity, a process referred to herein as "gravity fracturing." For the purposes of this disclosure, nuclear or radioactive waste is considered a hazardous waste although in the environmental industry radioactive waste is often not labeled as "hazardous waste." The method creates a dense fluid containing waste, introduces the dense fluid into a fracture, and extends the fracture downward until it becomes long enough to propagate independently. The fracture will continue to propagate downward to great depth, permanently isolating the waste.

Storing solid wastes by mixing the wastes with fluids and injecting them into hydraulic fractures is a well-known technology in the petroleum industry. Nuclear waste was injected into hydraulic fractures at Oak Ridge in the 1960s. The essence of the invention differs from conventional hydraulic fracturing techniques in that it uses fracturing fluid heavier than the surrounding rock. This difference is fundamental because it allows hydraulic fractures to propagate downward (rather than horizontally) and carry wastes by gravity instead of by pumping.

More specifically, the method of disposing nuclear waste and other hazardous waste includes the steps of blending the waste with water or other fluid and a weighting material to make a dense fluid or slurry of a predetermined density, temperature and viscosity; and injecting the dense fluid or slurry at a predetermined pressure and/or rate into a well so that the fluid or slurry enters the strata at a predetermined depth and continues to travel downward through the strata until the fluid or slurry becomes immobilized. Prior to the blending step, the waste, if in solid form, may be ground into particles of a predetermined size. The pressurized blended mixture cracks and dilates the rock structure, which is preferably a stable, low permeability rock structure such as many igneous and metamorphic rocks as well as some sedimentary rocks. (Initially, propping the fracture is avoided). Because the dense fluid has a density greater than that of the rock, the fluid or slurry has an absolute tendency to travel downward by gravity (until the density relationship changes or other mechanics arrest the downward travel) and remain far below the earth's surface. The dense fluid may include water, oil, gel or any fluid suitable for providing the required viscosity and density.

The well is preferably drilled at and on the site which generates the nuclear waste or other hazardous waste, thereby eliminating the need to transport the waste off-site and to the disposal site. The well includes a work string or tubing for receiving the blended fluid, waste and weighting material; a packer; and a cemented steel casing with perforations located at or about the predetermined depth. The predetermined depth is preferably in a range of about 10,000 to 30,000 feet (about 3,000 to 9,000 meters) but it can be shallower or deeper depending upon rock properties and drilling limitations. The weighting material may be other nuclear waste (including, for example, radionuclides such as uranium), other hazardous waste or a metal such as bismuth, lead, or iron in order to add weight to the primary waste which is being disposed. Metals or alloys that are in liquid phase at the temperature and pressure encountered in the subsurface are particularly suitable as a weighting material.

The work string may be pulled for routine cleaning or replacement. The blender used to blend the water, waste and weighting material is preferably shielded, as is the pumping unit (e.g., a pumping truck) used to pump the mixture at pressure into the well.

DETAILED DESCRIPTION OF THE PREFERRED EMBODIMENTS

Hydraulic fractures are created when the pressure in a fluid-filled crack causes the material at the crack tip to fail. The fracture advances and fluid flows forward to fill the newly created space. Hydraulic fractures are commonly created by using a pump to inject fluid into a well, but this is by no means the only occurrence. Geologic examples are well known in which hydraulic fractures grow upward through the Earth's crust because the fractures are filled with liquid lighter than their enveloping rock. A dike filled with magma that propagates upward to feed a volcanic eruption is one example of a hydraulic fracture propagating by gravity.

Figure 1:
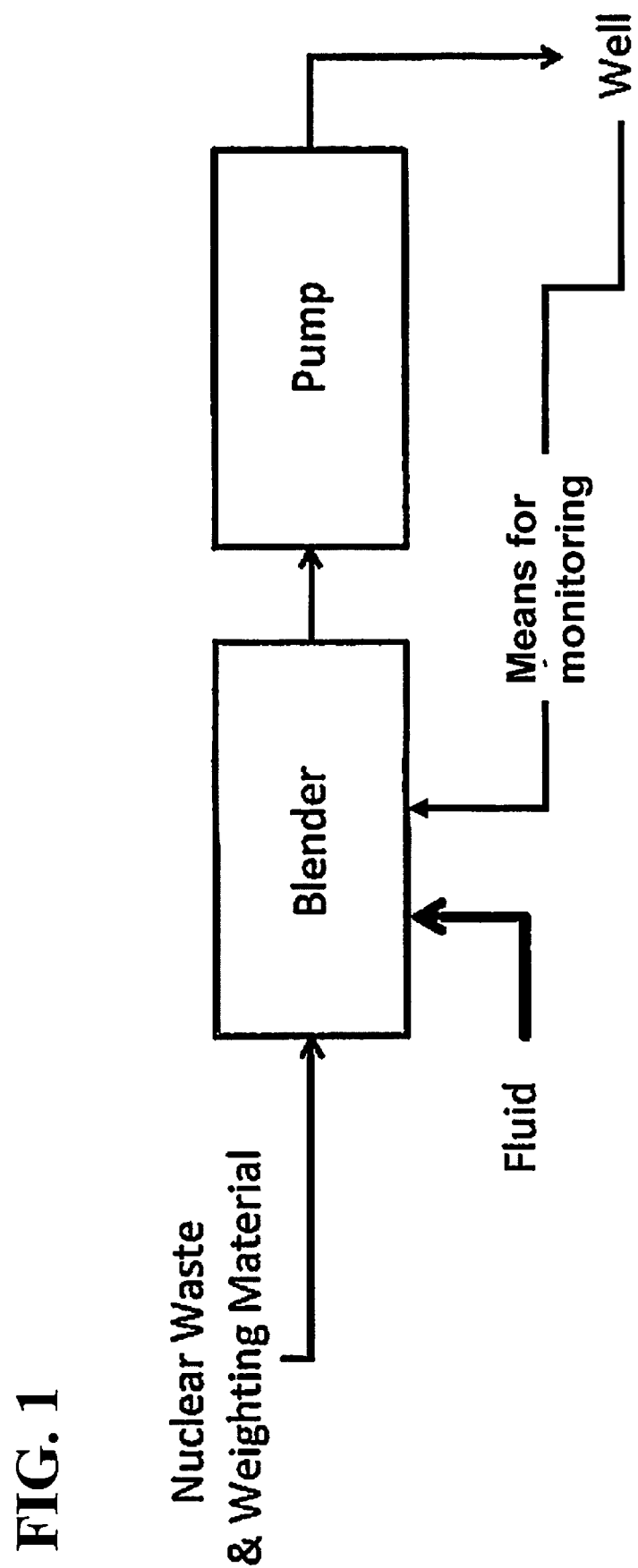
FIG. 1 is a process flow diagram of a preferred embodiment of a method according to this invention for disposing of nuclear waste and other hazardous waste. A dense fluid is introduced into a fracture (see FIG. 2) and continues to propagate downward by way of gravity (see FIG. 3).
Figure 2:
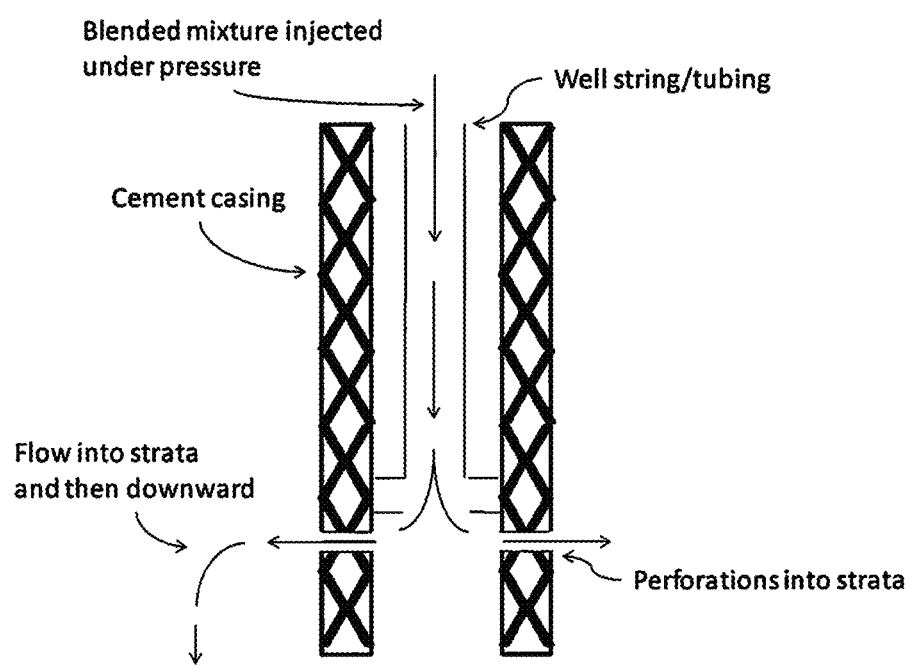
FIG. 2 is a well suitable for use in the practice of the method of FIG. 1. Rather than injecting the fluid sidewise into the well, alternate embodiments of the well could inject the fluid on other ways, including at the bottom.
Figure 3:
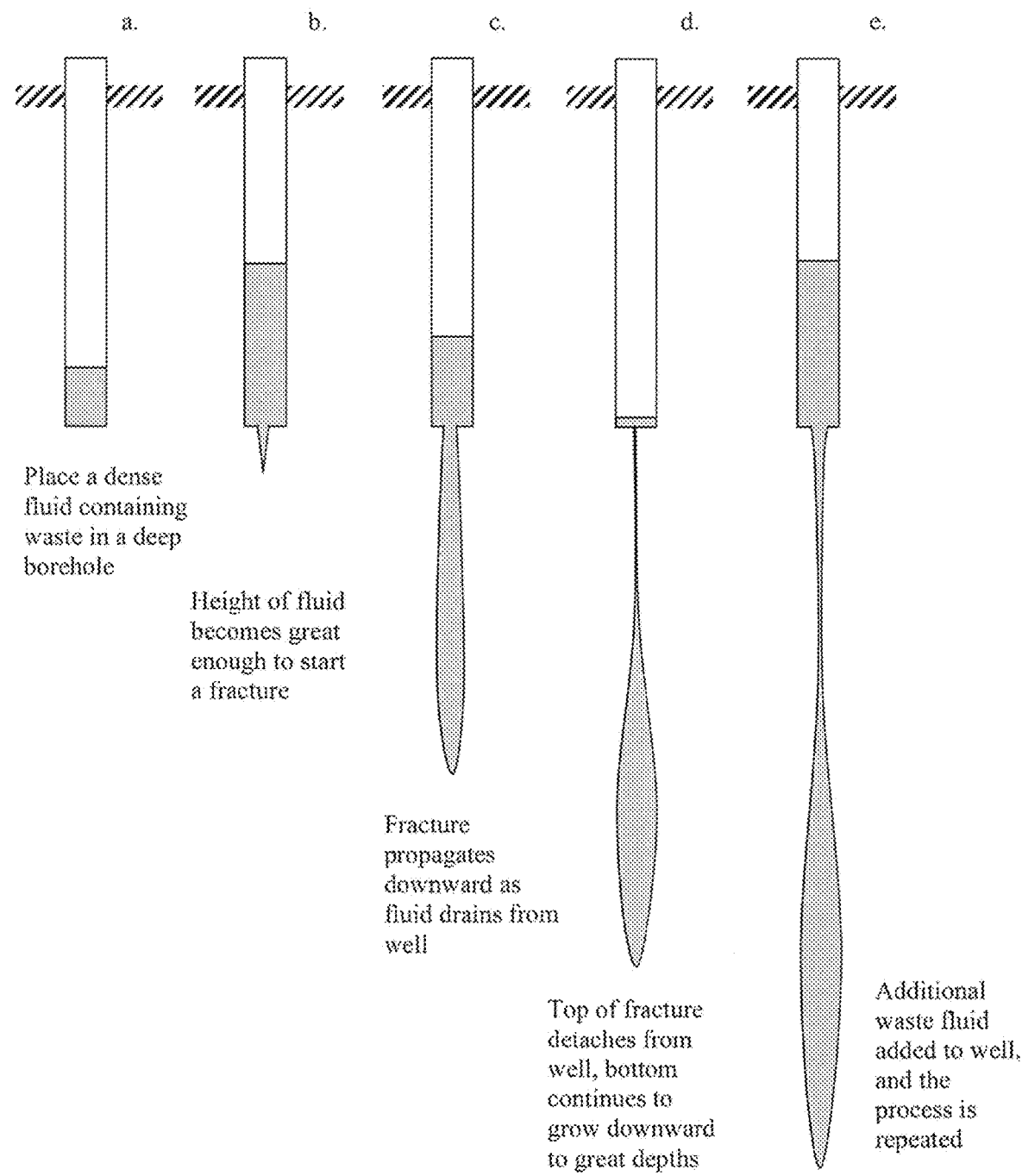
FIG. 3 illustrates the dense fluid of FIG. 1 as the dense fluid is introduced into a fracture and extends the fracture downward until it becomes long enough to propagate independently. The fracture continues to propagate downward to great depth, permanently isolating the waste. Although not illustrated, the dense fluid may propagate downward and then curve in a horizontal direction creating a sub-horizontal storage space.

A system and method according to this invention involves propagating hydraulic fractures downward by filling the fractures with dense fluid containing waste. Propagation occurs when the pressure in the fracture creates a stress intensity that exceeds the toughness or strength of the rock. Referring to FIGS. 1 to 3, an open borehole is created and filled with the dense fluid until the pressure at the bottom is sufficient to create a fracture (FIG. 3 at "a"). A similar fracturing process occurs during overbalanced drilling when the mud weight is too great and causes circulation to be lost by initiating a fracture and causing it to grow away from the borehole. Fluid will flow into the fracture and the level of fluid in the well will drop (FIG. 3 at "b"). However, the fracture is expected to advance faster than the rate of drop of fluid level in the well, so the overall height from the tip of the fracture to the top of the fluid column in the well lengthens. This increases the driving pressure and furthers downward propagation as the fluid in the wellbore drains by gravity into the fracture (FIG. 3 at "c").

The vertical span of the fracture continuously increases, causing the pressure at the bottom of the fracture to increase and ensuring continued downward propagation, even after all the liquid has drained from the well into the fracture (FIG. 3 at "d"). The pressure distribution causes the lower part of the fracture to bulge open and the upper part to pinch shut. A residual coating of fluid will be left behind when the fracture closes, and this will diminish the volume of fluid in the fracture. Eventually the original fluid will be spread as a thin coating on the fracture wall, extending from the bottom of the borehole to great depth. In the case of slurry, the fracture may be propped if the liquid leaks off into the rock.

The process is repeated by putting additional fluid into the well. This will create a new fracture that will follow the path of the earlier one (FIG. 3 at "e"). The additional fluid reaches an even greater depth than the original batch. The maximum depth that can be reached by dense fluids is unclear, but it could exceed tens of kilometers.

A method of disposing nuclear waste and other hazardous waste practiced according to this invention, therefore, effectively removes the waste from exposure to human activities at a time scale relevant to both societal actions and the half-lives of many hazardous radionuclides. The method includes the steps of blending the waste with materials suitable for creating a dense fluid or slurry which has a predetermined density and viscosity; and injecting the dense fluid at a predetermined pressure or rate into a well so that the dense fluid enters the strata at a predetermined depth and continues to travel downward through the strata until its flow stops, for example, because the solid-to-liquid ratio is too high to allow flow. Propagation may also stop when a sufficient amount of the dense fluid or fluid/slurry has been spread as a film or residue over the upper closed portion of the fracture.

Oil, gel or any fluid suitable for providing the required viscosity and density may be used Weighting material adds density to the primary waste which may be other types of nuclear waste, other hazardous waste or a metal such as, but not limited to, bismuth, lead, iron, copper, or low melting point metals or alloys (e.g., mercury, woods metal, indalloy 15, gallium) that could mix with and possibly dissolve or amalgamate high-level waste material. The low-melting-point alloys are a liquid under the expected pressure and temperature conditions at the bottom of the injection well. Solid compounds such as metals used for weighting material may be mixed with a high-shear-strength liquid, including polymer gels that may be crosslinked, or inorganic gels that may formed by hydrating clay minerals, to create a dense slurry. Prior to the blending step, the waste, if in solid form, may be ground to a predetermined size.

The pressurized dense fluid creates a vertical fracture or crack in the rock structure. The dense fluid enters the crack and serves to prop the rock structure. The rock structure is preferably a stable, low permeability rock formation, of the kind that nuclear reactors are typically built over and upon. Because of the weighting material, the density of the dense fluid is greater than that of the rock and this causes an absolute tendency for the fluid to travel downward until it becomes immobilized. If the density of the dense fluid is exactly equal to that of the rock, the dense fluid may be unable to overcome the rock fracture toughness. This is required for fracture propagation, hence the density should be somewhat higher to ensure the fracture growth. How much higher depends upon the fracture toughness magnitude, fluid properties, and other effects standard in industrial hydraulic fracturing.

In general terms, the density of rock increases as depth increases. Therefore, once the fracture propagates, a point can be reached where the density of the dense fluid becomes the same as the density of the rock, thereby limiting any further propagation downward. Eventually, the fracture becomes sub-horizontal and the dense fluid fills the fracture horizontally. This is similar to geological sills and does not hamper the proposed technology as the horizontal part of the growing fracture also allows for safe waste storage. Fracture toughness also increases with depth because it increases with such factors as temperature, pressure and size of the fracture. However, the effect of fracture toughness can be overcome by pressurizing the fracture.

For example, and just by way of example the immobilization point may occur at about 2,000 to 50,000 feet (about 600 to 15,000 meters) below the dense fluid's initial entry point into the strata. (The depth can be greater and is mostly constrained by drilling and pumping limitations.) The dense fluid can be monitored by using conventional tracer means to see whether any movement or migration has occurred upward relative to the perforations in the well casing, or it can be monitored using microseismics means to evaluate downward migration below the bottom of the region accessible to the well casing.

The well is preferably drilled at and on the site which generates the nuclear waste or other hazardous waste, thereby eliminating the need to transport the waste off-site and to the disposal site. The well also eliminates the need for temporary storage means on site because the waste can be transported directly to the well for immediate permanent disposal. As shown in FIG. 2, the well includes a work string or tubing for receiving the blended water, waste and weighting material; a packer; and a cement casing with perforations located at or about the predetermined depth. The predetermined depth is preferably in a range of about 10,000 to 30,000 feet (about 3,000 to 9,000 meters). The work string may be pulled for routine cleaning or replacement. The blender used to blend the water, waste and weighting material is preferably shielded, as is the pump truck used to pump the dense fluid at pressure into the well (see FIG. 1).

Examples of a system and method of this disclosure for creating a vertically downward propagating fracture in a rock formation include:
1. a fluid being denser than a rock formation into which the fluid is to be disposed so as to cause a vertical downward (gravity) fracture in the rock formation;
2. when the fluid is disposed into the rock formation, the fluid causes a vertical downward fracture in the rock formation, the fracture continuing to propagate vertically downward as the fluid propagates vertically downward in the fracture until an immobilization point of the fluid is reached;
3. the fracture having a length in a range of 2,000 feet to 50,000 feet;
4. means for disposing the fluid into a wellbore;
5. a wellbore having a depth in a range of 10,000 to 30,000 feet;
6. when the fluid exits a wellbore, the fluid causes a vertically downward fracture in the rock formation, the fracture continuing to propagate vertically downward as the fluid propagates vertically downward in the fracture until an immobilization point of the fluid is reached;
7. an immobilization point being at a depth in a range of 2,000 feet to 50,000 feet below where the fluid exits the wellbore;
8. the fluid includes a solid material or a liquid (or both);
9. a gravity fracture filled with a fluid having at least one waste selected from the group consisting of a radioactive waste and a hazardous waste, the fluid being denser than a rock formation into which the fluid is to be disposed so as to cause the rock formation to gravity fracture, the fluid propagating downward in the gravity fracture as the gravity fracture propagates downward;
10. the fluid has a density of at least 3.0 g/cm$^3$;
11. the fluid is a slurry;
    a. the slurry includes a solid material which is blended with the at least one waste;
        i. the solid material is a metal;
        ii. the metal is selected from the group consisting of bismuth, iron, lead, and copper;
        iii. the solid material contains one or more radionuclides;
        iv. a liquid component of the slurry is a metal having a melting temperature less than a temperature at a bottom end of an injection boring from which the fluid exits into the rock formation;
            1. the metal is selected from the group consisting of mercury, woods metal, indalloy 15, and gallium;
12. the fluid includes a liquid;
    a. the liquid includes at least a portion thereof selected from the group consisting of a cross-linked polymer gel and a hydrated clay slurry;
    b. the liquid is a metal having a melting temperature less than a temperature at a bottom end of an injection boring from which the fluid exits into the rock formation;
    c. the liquid is a metal selected from the group consisting of mercury, woods metal, indalloy 15, and gallium;
13. the fluid includes a solid material;
    a. the solid material is a metal;
        i. the metal is selected from the group consisting of bismuth, iron, lead, and copper;
    b. the solid material contains one or more radionuclides.

Preferred embodiments of a system and method for abyssal sequestration of nuclear waste and other types of hazardous waste have been described and illustrated, but not all possible embodiments. The inventive system and method itself is defined and limited by the following claims.

What is claimed is:

1. A system for creating a vertical downward propagating fracture in a rock formation, the system comprising:
a first stream;
a blending material including a liquid, a solid, or both a liquid and a solid, the blending material selected to produce, when mixed with the first stream, a fluid denser than a rock formation into which the fluid is to be disposed, wherein when the fluid is disposed in the rock formation, the fluid, wherein the fluid has an absolute tendency to travel downward and causes the vertical downward propagating fracture in the rock formation; said fracture continuing to propagate vertically downward as the fluid propagates vertically downward in said fracture until an immobilization point of the fluid is reached;
a blender for blending together the first stream and the blending material to produce the fluid; and
an injection boring including an opening located at a depth sufficient to allow the fluid to cause the vertical downward propagating fracture in the rock formation, said fracture continuing to propagate vertically downward as the fluid propagates vertically downward in said fracture until an immobilization point of the fluid is reached.

2. A system for creating a vertical downward propagating fracture in a rock formation, the system comprising:
a first stream to be routed into a tubing string of injection boring located in the rock formation;
a blending material selected to produce, when mixed with the first stream, a fluid denser than the rock formation into which the first stream is to be disposed, wherein the fluid has an absolute tendency to travel downward when the fluid is disposed in the rock formation; the blending material including a liquid, a solid, or both a liquid and a solid;
a blender for blending together the first stream and the blending material to produce the fluid; and
means for pumping the fluid into the tubing string;
wherein the injection boring includes an opening located at a depth sufficient to allow the fluid to cause the vertical downward propagating fracture in the rock formation, said fracture continuing to propagate vertically downward as the fluid propagates vertically downward in said fracture until an immobilization point of the fluid is reached.

3. The system of claim 2, wherein the fluid after entering said fracture propagating the fracture downwards after becoming detached from any fluid remaining in the injection boring.

4. The system of claim 2, wherein the immobilization point occurs at a depth in a range of about 3,000 meters to 15,000 meters.

5. The system of claim 2, further comprising:
means for monitoring a movement of the fluid after the fluid has exited the injection boring.

6. The system of claim 2, wherein the fluid is a slurry.

7. The system of claim 2, wherein the liquid includes at least a portion thereof being a selected from the group consisting of a cross-linked polymer gel and a hydrated clay slurry.

8. The system of claim 1, wherein the solid is a metal.

9. The system of claim 8, wherein the metal is selected from the group consisting of bismuth, iron, lead, and copper.

10. The system of claim 8, wherein the metal has a melting temperature less than a temperature at a bottom of the injection boring.

11. The system of claim 8, wherein the metal is selected from the group consisting of mercury, woods metal, indalloy 15, and gallium.

12. The system of claim 2, wherein the solid includes a radionuclide.

13. The system of claim 2, wherein the first stream includes at least one waste selected from the group consisting of a radioactive waste and a hazardous waste.

14. The system of claim 2, wherein the density of the fluid is at least 3.0 g/cm$^3$.

15. The system of claim 2, wherein the opening is at a depth in a range of 3,000 to 9,000 meters.

16. The system of claim 15, wherein the immobilization point occurs at a depth in a range of about 600 meters to 15,000 meters below the opening.

17. A system for creating a vertical downward propagating fracture in a rock formation, the system comprising:
an injection boring located in the rock formation;
a first stream to be routed into a tubing string of the injection boring;
a blending material selected to produce, when mixed with the first stream, a fluid denser than the rock formation into which the first stream is to be disposed, wherein the fluid has an absolute tendency to travel downward when the fluid is disposed in the rock formation; the blending material including a liquid, a solid, or both a liquid and a solid;
a blender for blending together the first stream and the blending material; and
means for pumping the fluid into the tubing string;
wherein the injection boring includes an opening located at a depth sufficient to allow the fluid to cause the vertical downward propagating fracture in the rock formation, said fracture continuing to propagate vertically downward as the fluid propagates vertically downward in said fracture until an immobilization point of the fluid is reached.

18. The system of claim 17, wherein the fluid is a slurry.

19. The system of claim 17, wherein the first stream includes at least one waste selected from the group consisting of a radioactive waste and a hazardous waste.

* * * * *